United States Patent

Blessin et al.

[15] 3,680,051

[45] July 25, 1972

[54] APPARATUS FOR MAINTAINING CHARACTER SYNCHRONIZATION IN A DATA COMMUNICATION SYSTEM

[72] Inventors: Ronald W. Blessin; James A. Kennedy, both of Phoenix, Ariz.

[73] Assignee: Honeywell Information Systems Inc.

[22] Filed: July 29, 1970

[21] Appl. No.: 59,094

[52] U.S. Cl. ....................340/172.5

[51] Int. Cl. ....................G06f 1/04

[58] Field of Search ....................340/172.5

[56] References Cited

UNITED STATES PATENTS

| | | | |
|---|---|---|---|
| 3,307,152 | 2/1967 | Robbins | 340/172.5 |
| 3,504,348 | 3/1970 | Hallman | 340/172.5 |
| 3,340,515 | 9/1967 | Little | 340/172.5 |
| 3,516,073 | 6/1970 | Goss et al. | 340/172.5 |
| 3,571,807 | 3/1971 | Candy | 340/172.5 |

*Primary Examiner*—Paul J. Henon

*Assistant Examiner*—Ronald F. Chapuran

*Attorney*—Edward W. Hughes and Fred Jacob

[57] ABSTRACT

Apparatus for maintaining character synchronization in a data communication system comprises a buffer to store characters being transferred from a communications controller to a terminal device, a shift register connected between the buffer and the terminal device and a source of fill characters which provides characters to fill any gap between message characters provided by the communications controller.

4 Claims, 6 Drawing Figures

INVENTOR.
RONALD W. BLESSIN
JAMES A. KENNEDY
BY Lloyd B. Guernsey

APPARATUS FOR MAINTAINING CHARACTER SYNCHRONIZATION IN A DATA COMMUNICATION SYSTEM

BACKGROUND OF THE INVENTION

The present invention pertains to data communications systems and more specifically, to apparatus for maintaining character synchronization between the timing signals in a communications controller and the message characters by providing synchronizing characters which fill in any space between characters transmitted between the communications controller and the terminal device.

Electronic data processing has rapidly become a necessary adjunct to the every day business world and provides not only means for calculating, accounting and general data processing, but also provides a source of business management information. To incorporate a data processing system into a business frequently requires a transmission of data for entry into the system over long distances. Terminal devices convert data from human readable form into binary form and transmit this data over wires or micro-wave relay systems from the terminal device to the data processor. The data processor operates upon the data received and sends a return message to the terminal device. To provide efficient use of the data communications equipment and to prevent loss of synchronization between the timing signals in the data processing portion of the system and the message characters being sent to the terminal portion it is important that a continuous stream of data be transmitted between the data processor and the terminal device. In prior art equipment whenever there was a break or gap between the message characters being transmitted from the data processor to the terminal device, the transmission was discontinued until characters were available and the complete message was retransmitted from the data processor to the terminal device. This resulted in an inefficient use of the data communications equipment.

The instant invention overcomes a disadvantage of the prior art by providing synchronizing or "fill" characters which are inserted between the regular message characters whenever there is a break or gap in the stream of data being transmitted between the data processor and the remote terminal device. These fill characters are automatically inserted by a communications controller subchannel which is connected to the data processor and these fill characters may be removed by the terminal device prior to being printed in human readable form.

It is, therefore, an object of this invention to provide a means for maintaining synchronization between the timing signals in a terminal device and the message characters when there is an interruption in the message characters supplied by the communications controller.

Another object of this invention is to provide a new and improved system for maintaining synchronization between the timing signals and the message characters in a communications controller when there is a space between message characters being sent from the communications controller to a terminal device.

A further object of this invention is to provide apparatus for inserting fill characters whenever there is a gap in the stream of message characters being sent from the communications controller to a terminal device.

SUMMARY OF THE INVENTION

The foregoing objects are achieved in accordance with one embodiment of the present invention by employing a data communication system that utilizes a plurality of fill characters to fill any space between message characters being sent from a communications controller to a terminal device. The message characters are stored in a buffer and are loaded a character at a time into a shift register and then are shifted a bit at a time to a transmission line connected between the communications controller and the remote terminal device. If the buffer should become empty at any time before termination of the message a source of fill characters connected to the shift register supplies one or more characters to the shift register until message characters are again received from the buffer. This prevents any break in the stream of data being transmitted between the communications controller and the remote terminal device and prevents loss of synchronization between the timing signals and the message characters being sent to the terminal device.

Other objects and advantages of this invention will become apparent from the following description when taken in connection with the accompanying drawings.

DESCRIPTION OF THE PREFERRED EMBODIMENT

Since the present invention pertains to the data processing and to data communication techniques, a description thereof can become very complex; however, it is believed unnecessary to describe all the details of the data communication system to completely describe the present invention. Therefore, most of the details that are relatively well known in the art will be omitted from this description. Even though details will be eliminated a basic description will be given of the entire system to enable one skilled in the art to understand the environment in which the present invention is placed. Accordingly, reference is made to FIG. 1 showing a simplified block diagram of a data communication system which uses the present invention.

Figure 1:
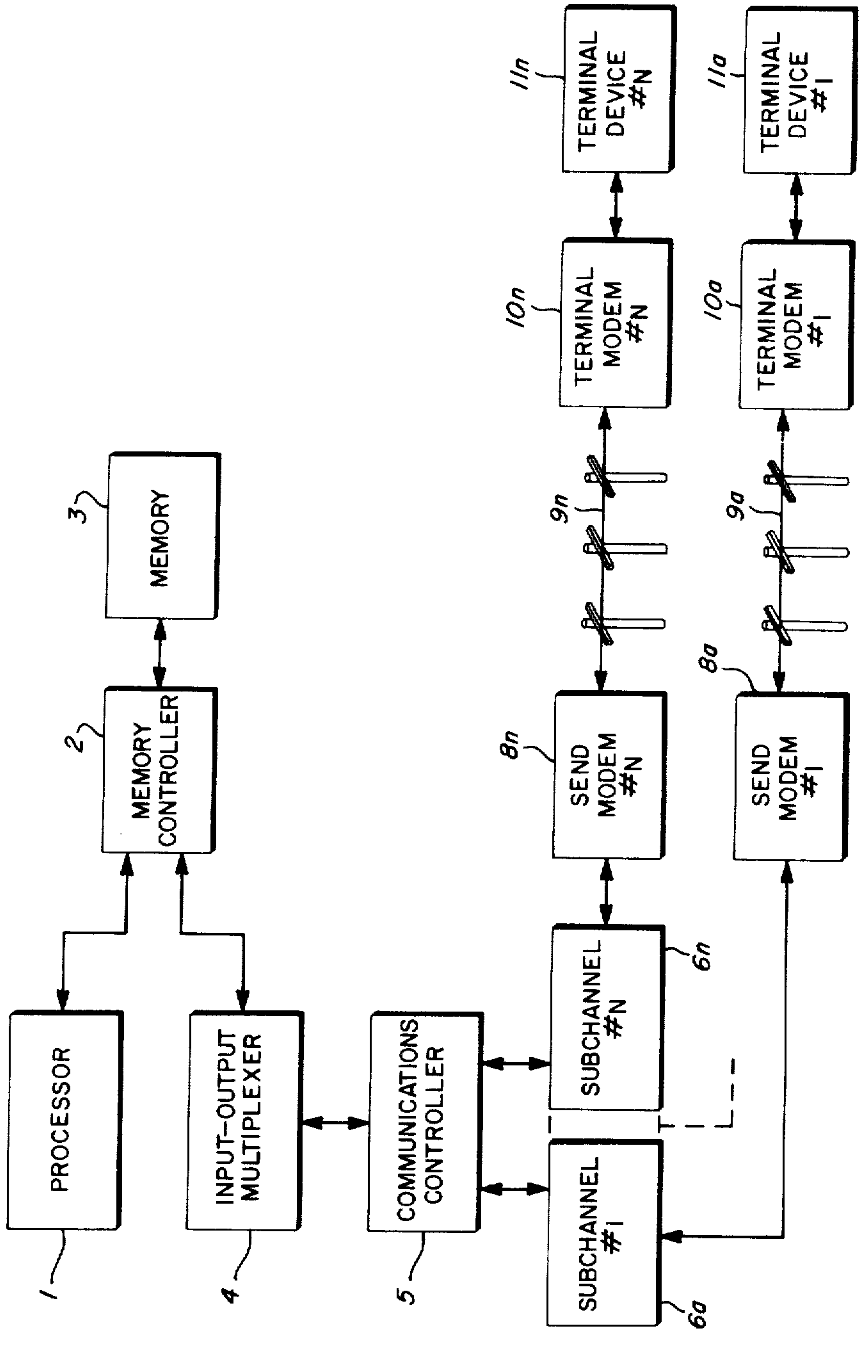
FIG. 1 is a simplified block diagram of a data communication system in which the present invention may be used.

The data communication system shown in FIG. 1 includes a data processor 1, a memory controller 2, a memory 3, an input/output multiplexer 4, a communications controller 5, and a plurality of subchannels *6a–6n*. The data processor 1 manipulates data in accordance with the instructions of a program. The processor receives an instruction, decodes the instruction and performs the operation indicated thereby. The operation is performed on data received by the processor and temporarily stored thereby during the operation. The series of instructions are called a program and include decodable operations to be performed by the processor. The instructions of the program are obtained sequentially by the processor and together with the data to be operated upon, are stored in the memory. The memory 3 shown in FIG. 1 may form many of several well known types; however, most commonly the main memory is a random access coincident current type having a plurality of discrete addressable locations each of which provides storage for a word. The word may form data or instructions and may contain specific fields useful in a variety of operations. Normally, when the processor is in need of data or instructions it will generate a memory cycle and provide an address to the memory. The data or word stored at the address location will subsequently be retrieved from memory and provided to the data processor 1.

A series of instructions comprising a program are usually "loaded" into the memory at the beginning of the operation and thus occupy a "block" of memory which normally must not be disturbed until the program has been completed. Data to be operated upon by the processor in accordance with instructions of the stored program is stored in memory and is retrieved and replaced in accordance with the binary coded instructions.

Communication with the data processing system usually takes place through the media of input/output devices such as magnetic tape handlers, paper tape readers, punched card readers, and remote terminal devices. To control the receipt of information from input/output devices and to coordinate the transfer of information to and from such devices, an input/output control means is required. Thus, an input/output controller or input/output multiplexer is provided and connects the data processing system to the variety of input/output devices. The input/output multiplexer coordinates the information flow to and from the various input/output devices and also awards priority when more than one input/output device is attempting to communicate. Since input/output devices are usually electro-mechanical in nature and necessarily have operating speeds which are much lower than the remainder of the data processing system, the input/output multiplexer provides buffering or temporary storage to enable the processing system to proceed at its normal rate without waiting for the time consuming communication with the input/output device.

The input/output multiplexer shown in FIG. 1 may have a plurality of input/output devices connected to the input/output multiplexer or input/output controller in the same manner as FIG. 1 of U.S. Pat. No. 3,413,613 by Bahrs et al. The communications controller 5 shown in the applicant's FIG. 1 appears to the input/output multiplexer 4 to be an input/output device, but this communication controller in turn controls a plurality of subchannels which may be connected through modems and telephone lines to terminal devices.

Binary information which may be supplied by the memory to one of the subchannels *6a–6n* is converted by one of the send modems *8a–8n* into modulated information which may be sent over telephone lines *9a–9n* to one of the terminal modems *19a–10n*. The terminal modem converts the modulated information into binary information for use by a corresponding one of the terminal devices *11a–11n*. Binary information which is generated by one of the terminal devices *11a–11* is converted by one of the terminal modems *10a–10n* into modulated information which is sent over the telephone lines to a corresponding send modem *8a–8n*, which converts the information into binary information again for use by a corresponding one of the subchannels 6a-6n. The send modems and the terminal modems may either receive modulated information and convert the modulated information into binary information or they may receive binary information and convert it into modulated information.

For a complete description of the processor of FIG. 1 and the instant invention which is embodied in such a processor, reference is made to the above U.S. Pat. No. 3,413,613 issued to David L. Bahrs et al., and assigned to the assignee of the present invention. More particularly, FIGS. 20–38 of the drawing; column 10, line 67 to column 32, line 21 of U.S. Pat. No. 3,413,613 are incorporated herein by reference and are made a part of the instant patent application.

Memory device 3 may be of the type disclosed in a co-pending application by David L. Bahrs, John F. Couleur, and Albert L. Beard entitled, "Synchronous Storage Control Apparatus for a Multi-Program Data Processing System," and assigned to the assignee of the present invention bearing Ser. No. 710,996 and filed on Mar. 6, 1968, now U.S. Pat. No. 3,521,240.

A more complete description of the operation of a data communication system is disclosed in a co-pending application by James A. Kennedy, Aldis Klavins and Robert J. Koegel, entitled "Data Communication System." This application is assigned to the assignee of the present invention and was filed on June 29, 1970.

When the computer program desires that a message be sent from the memory to a terminal device the subchannel which is connected to the terminal device is enabled so that the subchannel transmits the message. The characters of a message are transferred, one character at a time, from the memory through the controller to the subchannel and these characters are stored one at a time in the buffer 35 (FIG. 2) of the subchannel. The characters are then transferred, one character at a time, to the shift register 41 in the subchannel and the binary bits of the character are transferred one bit at a time from the shift register to the send modem (FIG. 1). The send modem converts the binary information into modulated information which is sent over the telephone lines to a corresponding receive modem where it is converted back to binary information and sent to the corresponding terminal device.

Figure 2A:
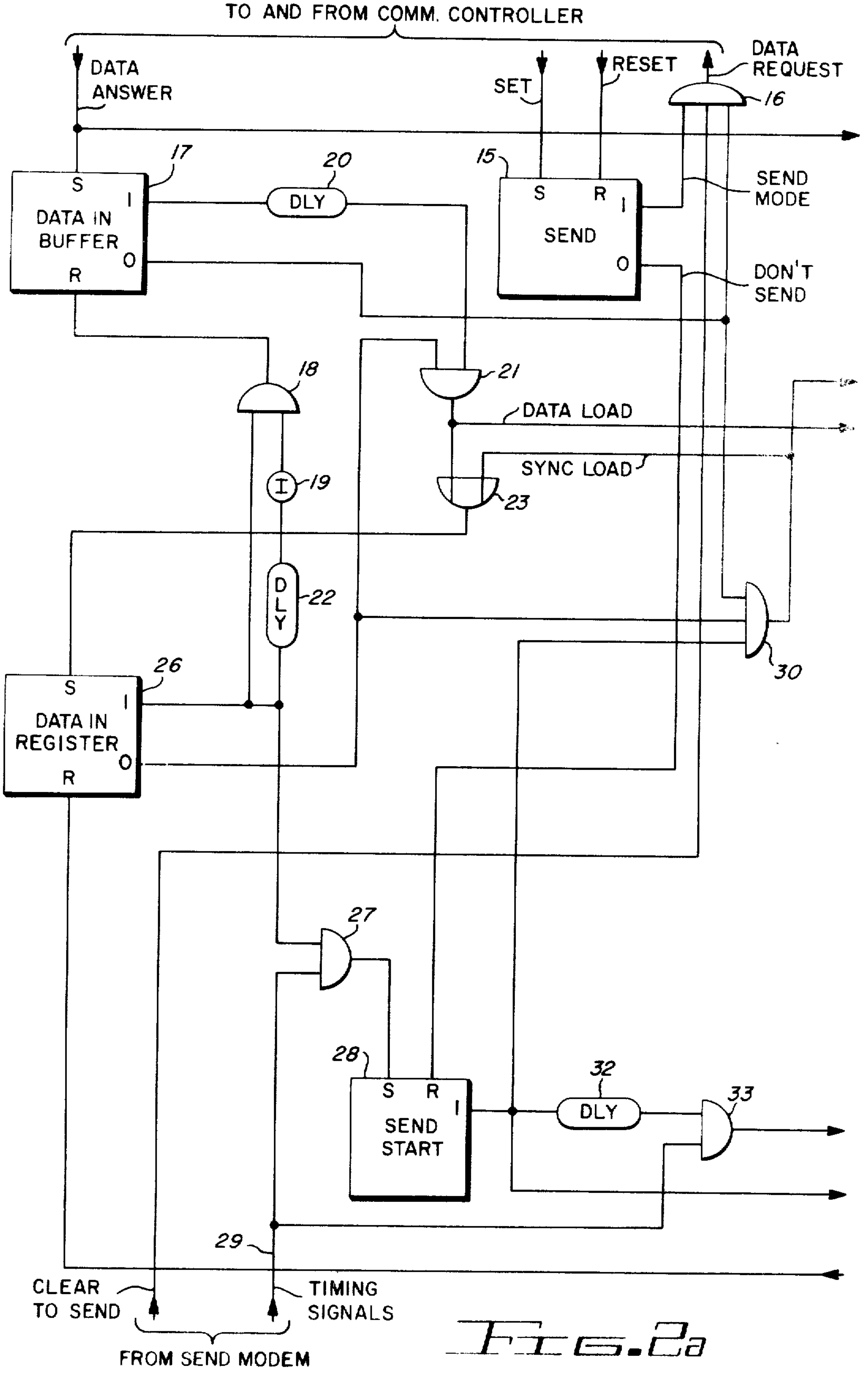
FIG. 2 consisting of FIGS. *2a*, *2b*, *2c*, and *2d* is a simplified block diagram of apparatus for maintaining synchronization in a data communication system where there is a gap in the stream of data being transmitted between the communications controller and a remote terminal device.

If the memory controller 2 (FIG. 1) or the input/output multiplexer 4 becomes busy and is not able to send the next message character through the communications controller to the buffer 35 the subchannel shown in FIG. 2 provides a fill character to fill in the space between the last message character and the next message character which will be sent. This fill character prevents loss of synchronization which would occur when there is a gap in the stream of data being sent from the subchannel to the modem and to the terminal device. This fill character is supplied by the source of fill characters 48 shown in FIG. 2*a*. If there should be a long time delay between the last message character which has been sent to the modem and the next one which is available several fill characters may be inserted at this point in the message. These fill characters may be removed by the terminal device shown in FIG. 1 so that they do not constitute a part of the message being delivered from the terminal device to the human readable message form. A variety of fill characters may be used in the invention shown in FIG. 2. The source of fill characters 48 may provide a fill character composed of a predetermined pattern of binary 1's and binary 0's. For example, a character may use a +4 volts for each of the binary 1's in the character and a value of zero volts for each binary 0.

Figure 2B:
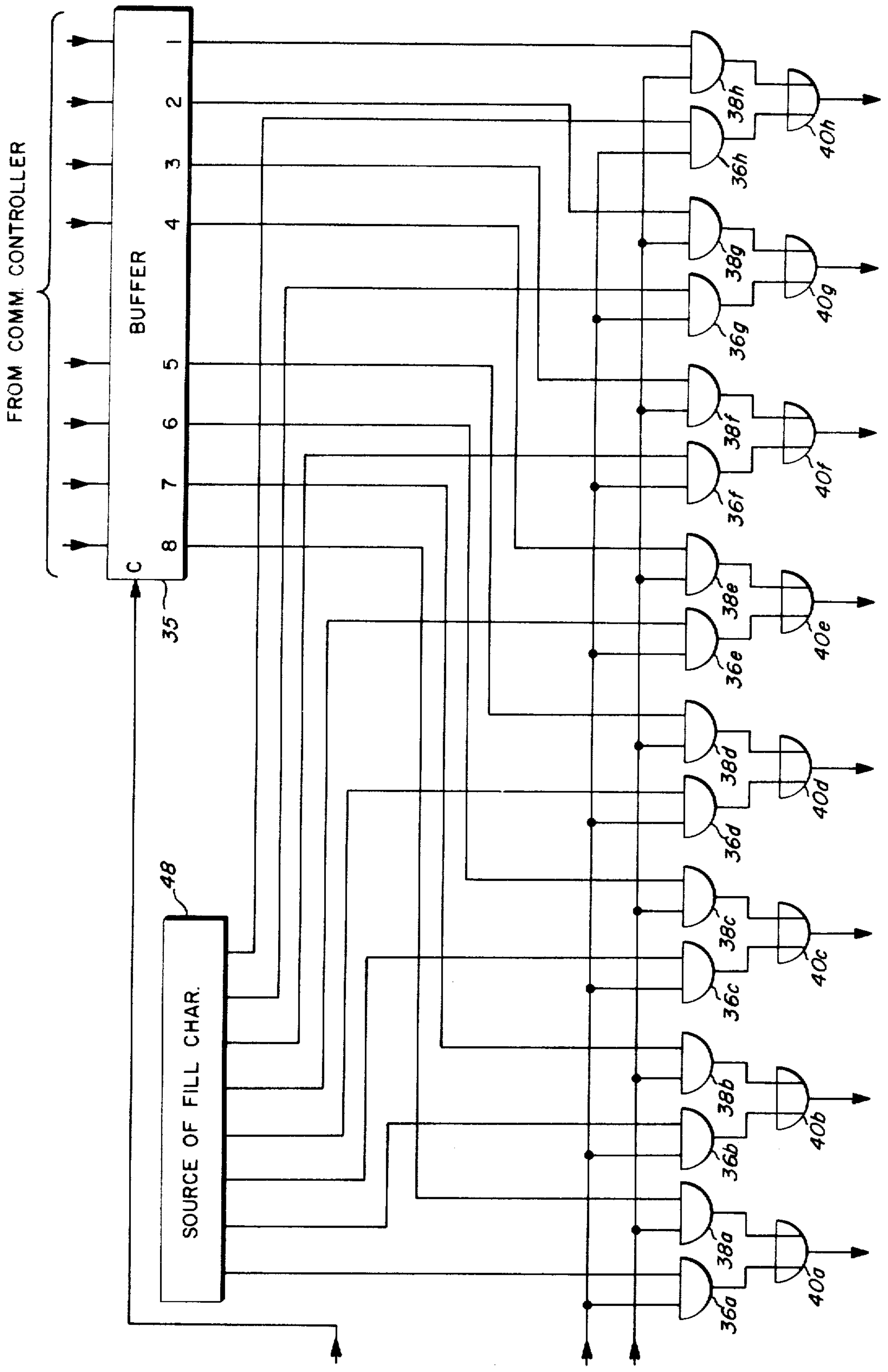
Figures 2C, 2D:
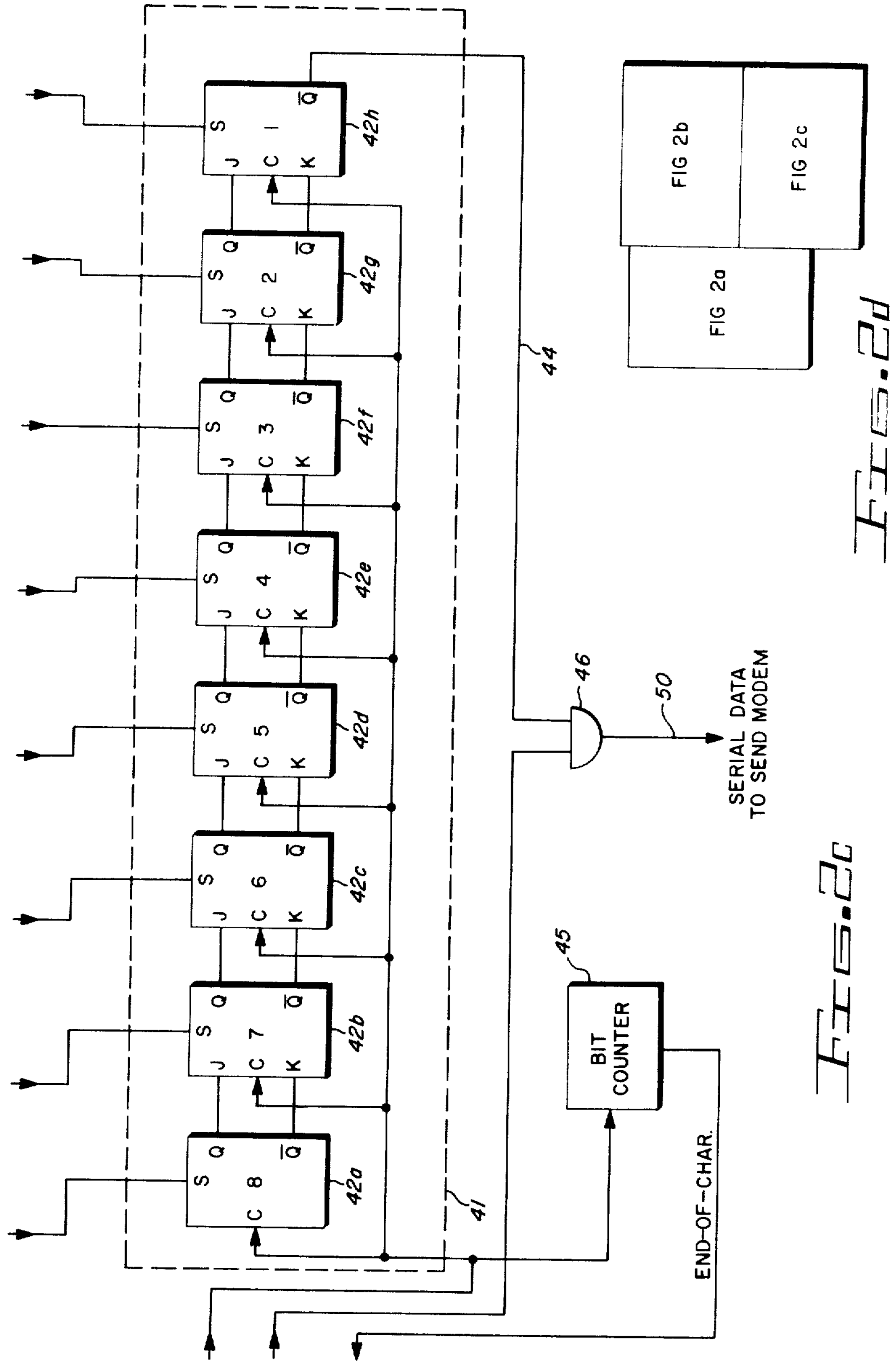
Figure 3:
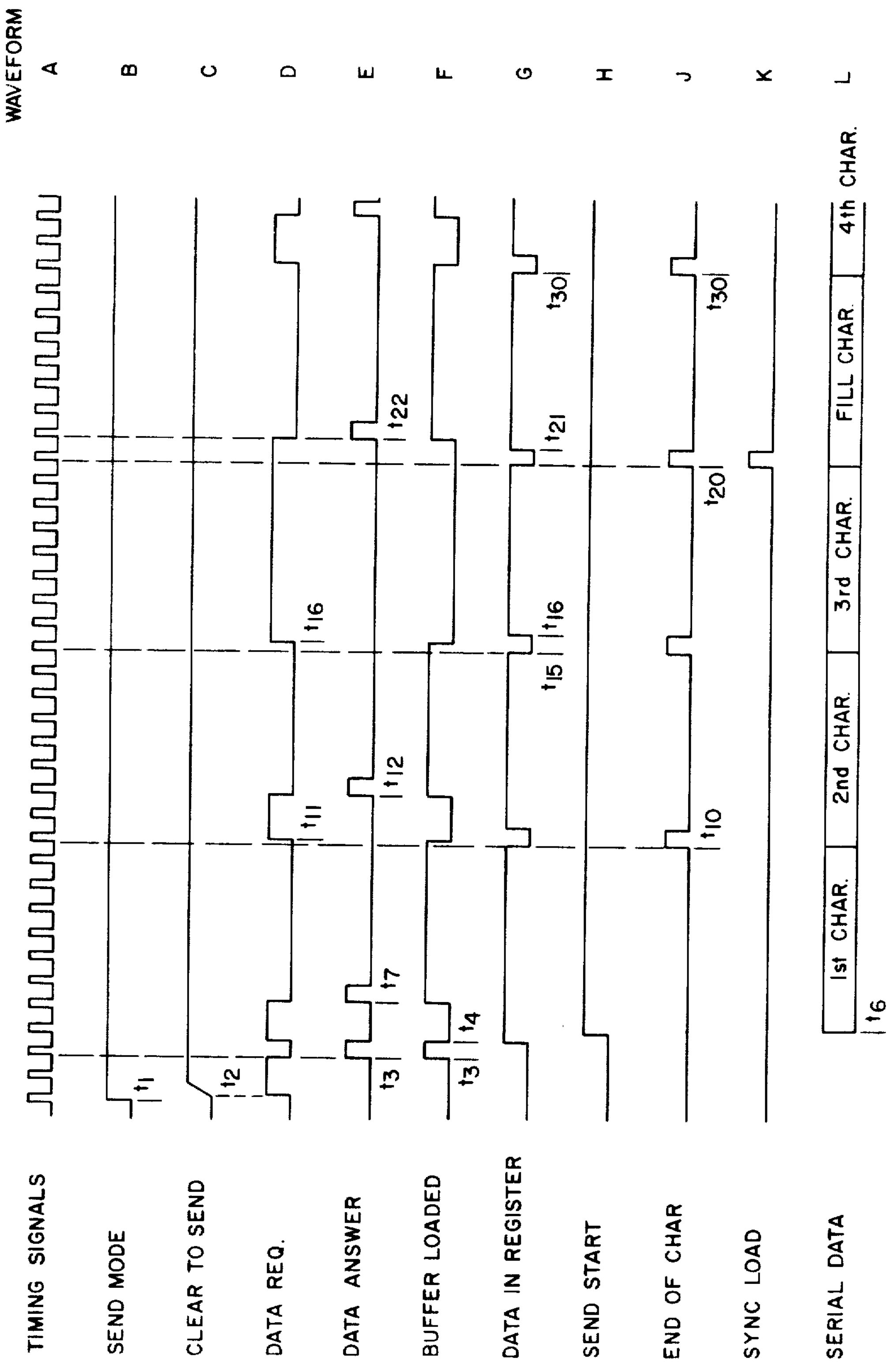
FIG. 3 illustrates waveforms which are useful in explaining the invention shown in FIG. 2.

A detailed description of the invention shown in FIGS. 2*a*, 2*b* and 2*c* will now be given in connection with the waveforms shown in FIG. 3. FIGS. 2*a*, 2*b* and 2*c* are drawn to be placed side by side as shown in FIG. 2*d*. Leads from the right side of FIG. 2*a* are connected to the leads from the bottom of FIG. 2*b* and to the bottom of FIG. 2*c*. Leads from the right side of FIG. 2*b* are connected to the left side of FIG. 2*c*.

The AND-gates disclosed in FIGS. 2*a*, 2*b* and 2*c* provide a logical operation of conjunction for binary 1 signals applied thereto. In the system disclosed, the binary 1 is represented by a positive signal, the AND-gate provides a positive output signal representing a binary 1, when and only when, all of the input signals applied thereto are positive and represent binary 1's. The symbols identified by the reference 21 and 30, in FIG. 2, represent AND-gates having two and three input terminals, respectively. Such AND-gates deliver a binary 1 output signal only when each of the input signals applied thereto represents a binary 1.

A flip-flop, as the term is used in the description of this portion of the present invention, is a bistable device whose output is the function of its last input. Such a flip-flop is shown and is represented by reference numeral 17 in FIG. 2*a*. This flip-flop is a two input, two output device having set (S) and reset (R) input terminals and a 1 and 0 output terminals. In this type of device, a binary 1 supplied to the set (S) terminal places the flip-flop into its set state in which condition there is a binary 1 at its 1 output terminal and a binary 0 at its 0 output terminal. Conversely, a binary 1 supplied to the reset (R) terminal places the flip-flop into the state in which there is a binary 1 at its 0-output terminal and a binary 0 at its 1-output terminal.

When the computer program desires to send a message from the memory to one of the terminal devices a signal is sent through the communications controller to the set terminal of the "send" flip-flip 15 in the subchannel shown in FIG. 2. When send flip-flop 15 is set a signal representing a binary 1 is provided at the 1-output terminal and is connected to one of the leads of AND-gate 16. A waveform representing this signal at the 1-output terminal is shown in waveform B of FIG. 3 and is labelled "send mode" signal.

When the send modem is ready to receive a message and to send this message over telephone lines to a terminal modem, the send modem provides a "clear to send" signal which is applied to a second lead of AND-gate 16. The "data in buffer" flip-flop 17 is reset from a previous operation and provides a third signal to the AND-gate 16 so that AND-gate 16 is enabled and provides a "data request" signal to the communication controller 5 at time $t_2$ (waveform D). The clear-to-send signal is shown in waveform C of FIG. 3. When the path from the memory, through the memory controller, input/output multiplexer and communications controller is clear so that a character can be loaded into the subchannel a "data answer" signal is provided to the set terminal of the "Data in Buffer" flip-flop 17. The data answer signal sets flip-flop 17 at time $t_3$, thereby providing a "buffer loaded" signal (waveform F) at the 1-output terminal of flip-flop 17. At this same time a character is transferred from the memory through communications controller 5 and is applied to the data output lines connected to the buffer 35 (FIG. 2). The data answer signal causes the character from the data output lines to be loaded into the buffer 35. The buffer 35 shown in FIG. 2*b* may comprise eight J–K flip-flops, one for each bit of the character being stored. The S input terminal of each flip-flop may be connected to a corresponding one of the leads from the communications controller. The C input lead of each of the flip-flops may be connected to the lead which carries the data answer signal from the communications controller. A description of buffers may be found in the text book, "Electronic Digital Systems" by R. K. Richards, 1966, John Wiley, New York, New York.

The "Data In Register" flip-flop 26 which has been reset in a previous operation provides a binary 1 from the 0-output terminal to one lead of AND-gate 21. The signal from the 1-output terminal of flip-flop 17 is delayed by delay circuit 20 and is applied to the other lead of AND-gate 21 thereby enabling gate 21 and providing the "data load" signal to one lead of each of the AND-gates 38*a*–38*h*, thereby enabling gates 38*a*–38*h* and causing the binary bits which are stored in buffer 35 to be gated through these gates to the OR circuits 40*a*–40. These binary bits are coupled through OR-gates 40*a*–40 and to the J–K flip-flops 42*a*–42*h* which comprise the shift register 41. Thus, it can be seen that the binary bits comprising the character are loaded in parallel, or all at one time, into the shift register 41. The data load signal which was applied to each of the AND-gates 38*a*–38*h* is also coupled through OR-gate 23 to the set terminal of the "Data In Register" flip-flop 26, thereby setting flip-flop 26 at time $t_4$. When flip-flop 26 is set a binary 1 is developed at the 1-output terminal.

Delay circuit 22, inverter 19 and AND-gate 18 develop a positive pulse which resets flip-flop 17 at time $t_4$. An inverter provides the logical operation of inversion for an input signal applied thereto. The inverter provides a positive output signal representing a binary 1 when the input signal applied thereto has a value of zero volts, representing a binary 0. Conversely, the inverter provides an output signal representing a binary 0 when the input signal represents a binary 1. The positive pulse which resets flip-flop 17 is generated by applying a binary 1 to the left lead of AND-gate 18 and by delaying the binary 0 which was applied to delay line 22 prior to time $t_4$. This delayed binary 0 is inverted by inverter 19 and a binary 1 is applied to the right lead of AND-gate 18 causing gate 18 to be enabled during the time that both leads have binary 1's applied. This positive pulse resets flip-flop 17 so that a binary 1 is again developed at the 0-output terminal and a data request signal from AND-gate 16 is sent to the communication controller. A data answer pulse at time $t_7$ causes another message character to be loaded into the buffer 35.

The OR logic signals are developed by OR-gates which provide the logical operation of inclusive OR for positive signals applied thereto. The OR-gates provide an output signal representing a binary 1, when any one or more of the input signals applied thereto represent binary 1's. When none of the output signals represent binary 1's, the output signal represents a binary 0. The symbol identified by reference 23 and 40 in FIGS. 2*a* and 2*b* represents OR-gates having two and three input terminals, respectively.

A shift register is a device which uses a plurality of storage devices such as flip-flops, to store a plurality of bits of information. For example, the shift register 41 shown in FIG. 2 may use eight J–K flip-flops to store eight binary bits of data. In this register, the binary bit stored in each flip-flop will be shifted one place to the right each time a clock pulse is applied to the C lead on the flip-flops. A description of shift registers can be found in the text book entitled "Digital Computer Fundamentals," by Thomas C. Bartee, Second Edition, by McGraw-Hill, 1966, New York, N.Y.

The J–K flip-flops or bistable multivibrator referred to in the specification, and shown, for example, in FIG. 2 of the drawings, are circuits adapted to operate in either one of two stable states and the transfer from the state in which they are operating to the other stable state upon the application of a trigger signal thereto. In one state of operation the J–K flip-flop represents the binary 1 (1-state) and in the other state, the binary 0 (0-state). The three leads entering the left hand side of the flip-flop symbol, for example, flip-flop 42*b*, shown in FIG. 2, provide the required signals. The upper lead, the J lead, provides a set signal, the lower lead, the K lead, provides a reset input signal and the center lead provides the trigger signal. When the set input signal on the J lead, is positive and the reset signal, on the K lead, is zero, a positive trigger signal on the C lead causes the flip-flop to change to the 1-state, if it is not already in a 1-state. When the reset signal is positive and the set signal zero, a positive trigger causes the flip-flop to transfer to the 0-state if it is not already in the 0-state.

When the J and K input leads are both positive, or when the J–K leads are not connected to an external signal source, a positive signal pulse causes the flip-flop to change states. The S lead entering the top of the flip-flop and the R lead entering the bottom of the flip-flop also provide set and reset signals respectively. When a positive voltage potential is provided to the S lead the flip-flop sets to the 1-state and remains in the 1-state as long as the positive voltage potential remains on S lead irrespective of any signals on the J–C and K leads. When a positive voltage potential is applied to the R lead the flip-flop resets to the 0-state and remains in the 0-state as long as the positive voltage potential remains on the R lead irrespective of the J, C and K leads. Some flip-flops do not provide these S and R leads, for example, flip-flops 42*a*–42*h* in FIG. 2 do not provide the R lead. The two leads leaving the right hand side of the flip-flop deliver the output signals for each flip-flop. The upper output leads, the Q leads, deliver the 1-output signals of the flip-flop and the $\overline{Q}$ output leads, deliver the 0-output signals.

The delay lines shown in FIG. 2*a* provide a given predetermined amount of time delay for a signal applied to the input terminals thereto. The symbol identified by reference numeral 20 represents a delay line. A signal applied to the input lead on the left hand of delay line 20 is delayed for a predetermined amount of time and appears at the output lead at the right hand of delay line 20. Delay lines of the type used in the present invention are described in the text book "Digital Computer Fundamentals" Second Edition, by Thomas C. Bartee, 1966, McGraw-Hill, New York, N.Y.

At time $t_4$ the binary 1 from the 1-output terminal of flip-flop 26 is also coupled to one load of AND-gate 27 and timing signals from the send modem are coupled to the other lead of AND-gate 27 so that the next timing pulse enables AND-gate 27 at time $t_5$. When AND-gate 27 is enabled the timing signal is coupled to the set terminal of the "Send Start" flip-flop 28 thereby providing a binary 1 at the 1-output terminal of flip-flop 28. This binary 1 enables AND-gate 46 so that the binary bit from the output terminal of flip-flop 42*h* is transferred over output line 50 to the send modem. The binary 1 at the 1-output terminal of flip-flop 28 is delayed by delay circuit 32 and applied to one lead of AND-gate 33. The next timing pulse on line 29 is coupled through AND-gate 33 to the timing or C lead of each of the flip-flops 42*a*–42*h* and causes the binary bits which are stored in each of these flip-flops to be shifted one position to the right so that the information which was in flip-flop 42*g* is shifted to flip-flop 42*h*. AND-gate 46 is still enabled by the binary 1 at the 1-output lead of flip-flop 28 so that the binary bit which is shifted to flip-flop 42*h* is transferred over output line 50 to the send modem.

When the next timing pulse from the send modem is applied to AND-gate 33 the next binary bit is shifted into flip-flop 42*h* and is coupled over lines 44 and 50 to the send modem. Thus, it can be seen that the binary bits are shifted in serial form from the shift register 41 to the send modem.

As the eight binary bits of the character are shifted out of shift register 41 to the send modem the timing signals from the send modem which are coupled through AND-gate 33, are also applied to the bit counter 45 causing the counter to count up to a binary value of 8. When the count in counter 45 reaches a value of 8 the counter develops an end-of-character signal which resets flip-flop 26, thereby causing a binary 1 to be developed at the 0-output terminal of flip-flop 26. The counter 45 may be a well known type comprising four J–K flip-flops with the Q-output of the first flip-flop connected to the C input lead of the second. The Q-output of the second flip-flop is connected to the C input of the third and the Q-output lead of the third is connected to the C input of the fourth. The Q-output lead of the fourth flip-flop in the counter provides an end-of-character signal to the Data in Register flip-flop 26. In addition the end-of-character signal is applied to the reset input lead of each stage. Details of the counter may be found in the printed publication "Integrated Circuits SUHL — AND input J–K Flip-Flop SF52/SF53" 1965 by Sylvania, Woburn, Mass.

At time $t_{15}$ (waveform J) an end of character pulse from bit counter 45 resets the data in register flip-flop 26 thereby providing a binary 1 at the 0-output terminal of flip-flop 26. This binary 1 from the 0-output terminal of flip-flop 26 is applied to the one lead of AND-gate 21 and the binary 1 from the data in buffer flip-flop 17 applied to the other lead of AND-gate 21 enables AND-gate 21 thereby providing a signal to OR-gate 23 and to the set input terminal of data in register flip-flop 26 thereby setting flip-flop 26. When flip-flop 26 is set at time $t_{16}$ (Fig. 3) the binary 1 which is developed at the 1-output terminal is coupled through delay circuit 22 to the reset terminal of flip-flop 17 thereby resetting the data in buffer flip-flop 17. When flip-flop 17 is reset a binary 1 from the zero output terminal, a send mode signal from flip-flop 15, and a clear-to-send signal are applied to AND-gate 16, thereby generating a data request signal to the communications controller. If the communications controller does not receive an answer from the memory (FIG. 1) there will be no answer coming back to AND-gate 14 and no data answer signal developed at the output of GATE 14 so that buffer 35 will remain empty.

At time $t_{20}$ (FIG. 3) the third character has been shifted from the shift register 41 over lines 44 and 50 to the send modem. At this time another character should be loaded from buffer 35 into shift register 41; however, buffer 35 is empty. At time $t_{20}$ the bit counter 45 develops an end-of-character signal which causes the flip-flop 26 to be reset. When flip-flop 26 is reset a binary 1 is developed at the 0-output terminal and is coupled to AND-gate 30. At this same time a binary 1 is present at the 0-output terminal of data in buffer flip-flop 17 which has not been set since there was no answer signal from the communications controller. The third signal from the 1-output terminal of send start flip-flop 28 enables AND-gate 30 and provides a "sync load" signal to AND-gates 36*a*–36*h* thereby causing the binary bits from the source of fill characters 48 to be gated through gates 36*a*–36*h* and through OR-gates 40*a*–40*h* into the flip-flops 42*a*–42*h* which comprise the shift register 41. Thus a fill, or sync character has been loaded into the shift register to prevent any gap between the characters being shifted from the register 41 over lines 44 and 50 to the send modem. The sync load signal also sets flip-flop 26. When the final bit of each character is transferred to the send modem the bit counter 45 provides an end-of-character pulse which causes flip-flop 26 to be reset and causes another fill character to be loaded into shift register 41. This continues until message characters from the communications controller are again loaded into the buffer 35.

Flip-flop 17 remains reset until a data answer signal is received from the communications controller. Flip-flop 28 remains set until send flip-flop 15 receives a reset signal from the communications controller which causes flip-flop 15 to develop a "don't-send" signal which resets flip-flop 28.

When another data answer signal is received from the communications controller, as shown at time $t_{22}$, a message character is loaded into buffer 35. When the next end-of-character pulse is developed by counter 45, at time $t_{30}$, the message character is loaded into shift register 41 and is then shifted over lines 44 and 50 as described above.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

We claim:

1. In a data communication system having a processor, a memory, a communications controller, a terminal device and a subchannel, said subchannel having the combination comprising:

a buffer for storing a message character, said buffer being coupled to said controller;

a shift register, said register being coupled to said device;

first and second gating means, said first gating means being connected between said buffer and said register;

a source of fill characters, said second gating means being connected between said source and said register;

means for detecting when each bit of a character is shifted from said register to said device, said means for detecting being coupled to said register, said means for detecting producing a signal pulse when the final bit of a character is shifted from said register; and means for sensing when a message character is loaded into said buffer, said means for sensing being connected between said buffer and said first gating means, said means for detecting being coupled to said first and to said second gating means, said means for sensing developing a first signal when a message character is loaded into said buffer, said means for sensing developing a second signal when a message character is not loaded into said buffer, said means for sensing being coupled to said second gating means, said first signal and said signal pulse causing said first gating means to transfer a message character from said buffer into said register, said second signal and said signal pulse causing said second gating means to transfer a fill character from said source into said register.

2. In a data communication system having a processor, a memory, a communications controller, a terminal device and a subchannel, said subchannel having the combination comprising:

a buffer for storing a message character, said buffer being coupled to said controller;

a shift register, said register being coupled to said device;

first and second gating means, said first gating means being connected between said buffer and said register;

a source of fill characters, said second gating means being connected between said source and said register;

means for detecting when each bit of a character is shifted from said register to said device, said means for detecting being coupled to said register, said means for detecting producing a signal pulse when the final bit of a character is shifted from said register; and means for sensing when a message character is loaded into said buffer, said means for sensing being coupled to said second gating means, said means for sensing being connected between said buffer and said first gating means, said means for detecting being coupled to said first and to said second gating means, said means for sensing developing a first signal when a message character is loaded into said buffer, said means for sensing developing a second signal a predetermined time after a message character is loaded into said buffer, said first signal and said signal pulse causing said first gating means to transfer a message character from said buffer into said register, said second signal and said signal pulse causing said second gating means to transfer a fill character from said source into said register.

3. The combination as defined in claim 2 including:

means to inhibit said means for sensing from developing said second signal when another message character is loaded into said buffer, said means to inhibit being coupled to said buffer and to said means for sensing.

4. In a data communication system having a processor, a memory, a communications controller, a terminal device and a subchannel, said subchannel having the combination comprising:

a buffer for storing a message character, said buffer being coupled to said controller;

a shift register, said register being coupled to said device;

first and second gating means, said first gating means being connected between said buffer and said register;

a source of fill characters, said second gating means being connected between said source and said register;

means for detecting when each bit of a character is shifted from said register to said device, said means for detecting being coupled to said register, said means for detecting producing a signal pulse when the final bit of a character is shifted from said register;

means for sensing when a message character is loaded into said buffer, said means for sensing being coupled to said second gating means, said means for sensing being connected between said buffer and said first gating means, said means for detecting being coupled to said first and to said second gating means, said means for sensing developing a first signal when a first message character is loaded into said buffer, said means for sensing developing a second signal a predetermined time after said first message character is loaded into said buffer, said first signal and said signal pulse causing said first gating means to transfer a message character from said buffer into said register, said second signal and said signal pulse causing said second gating means to transfer a fill character from said source into said register; and means to inhibit the developing of said second signal when a second message character is loaded into said buffer before the end of said predetermined time, said means to inhibit being coupled to said means for sensing.

* * * * *